United States Patent Office 3,413,260
Patented Nov. 26, 1968

3,413,260
STABILIZATION OF SOLID POLYMERS WITH QUATERNARY AMMONIUM BOROHYDRIDES
Joseph T. Arrigo, Mount Prospect, Ill., assignor to Universal Oil Products Company, Des Plaines, Ill., a corporation of Delaware
No Drawing. Continuation-in-part of application Ser. No. 269,794, Apr. 1, 1963. This application May 25, 1966, Ser. No. 552,698
8 Claims. (Cl. 260—45.9)

ABSTRACT OF THE DISCLOSURE

Plastic normally subject to deterioration by ultraviolet light containing, as an inhibitor against such deterioration, a stabilizing concentration of from about 0.5% to about 10% by weight of a soluble quaternary ammonium borohydride inhibitor. For example, tricaprylmethylammonium borohydride is an effective inhibitor for polyethylene.

---

This is a continuation-in-part of copending application 269,794, filed Apr. 1, 1963, now abandoned, and relates to the stabilization of plastics and more particularly to a novel method of inhibiting deterioration of plastic caused by ultraviolet (UV) light.

Most, if not all, plastics undergo deterioration when exposed to sunlight. This deterioration is characterized in its early stages by the breaking of the polymer chain and the formation of carbonyl groups. As the deterioration continues, the plastic cracks and loses tensile strength to the point of mechanical failure. For example, electrical insulation prepared from plastic will undergo embrittlement, increase of power factor and loss of electrical resistance when used in exposed locations. Other examples of the use of plastics in outdoor exposure are in the preparation of sheets which are used in draping open areas in building construction to protect the construction from the effect of weather, and in the manufacture of lightweight outdoor furniture, covers for greenhouses, awnings, etc.

In addition to inhibiting deterioration which results in embrittlement cracking, etc., of the plastic, another important advantage of the additives of the present invention is that they do not impart any objectionable color to the plastic during milling or outdoor exposure. This is especially important in plastics for outdoor use, as well as being of advantage in plastics used indoors but exposed to sunlight.

A definition of plastic which seems to be accepted in the industry is that plastic comprises a large and varied group of materials which consist of, or contain as an essential ingredient, a substance of high molecular weight which, while solid in the finished state, at some stage in its manufacture is soft enough to be formed into various shapes, usually through the application, either singly or together, of heat and pressure. Plastic generally is prepared by the condensation or polymerization of a single monomer or of a mixture of monomers. The plastic further may be classified as thermosetting or thermoplastic. As hereinbefore set forth, most, if not all, of the plastics undergo deterioration upon exposure to UV light and the present invention provides a novel method of inhibiting such deterioration.

In one embodiment the plastic comprises a solid olefin polymer. This may comprise homopolymers or copolymers of olefinic hydrocarbons including particularly polyethylene, propylene and polybutylene, as well as copolymers of ethylene and propylene, ethylene and butylene and propylene and butylene. In addition, solid polymers prepared from one or more higher molecular weight olefins may be stabilized in accordance with the present invention.

Another plastic available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight for extended periods of time.

Another class of plastics available commercially is broadly classed as vinyl resins and is derived from monomers such as vinyl chloride, vinyl acetate, vinylidene chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other plastics being used commercially on a large scale are in the textile class and include polyamides, Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light.

Still other plastics are prepared from other monomers and are available commercially. Illustrative examples of such other solid polymers include phenol-formaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale.

The plastic may be fabricated into any desired finished product including moldings, castings, fibers, films, sheets, rods, tubing or other shapes.

In one embodiment the present invention relates to a method of stabilizing plastic normally subject to deterioration by ultraviolet light which comprises incorporating in said plastic a stabilizing concentration of a soluble quaternary ammonium borohydride inhibitor.

In a specific embodiment the present invention relates to a method of stabilizing polyethylene against deterioration by ultraviolet light which comprises incorporating in said polyethylene a stabilizing concentration of tricaprylmethylammonium borohydride.

In another embodiment the present invention relates to a method of stabilizing polypropylene against deterioration by ultraviolet light which comprises incorporating in said polypropylene a stabilizing concentration of cetyltrimethylammonium borohydride.

In still another embodiment the present invention relates to plastic subject to deterioration by ultraviolet light containing, as an inhibitor against such deterioration, a stabilizing concentration of a soluble quaternary ammonium borohydride.

As an important and essential feature of the present invention, the quaternary ammonium borohydride must be readily soluble in the plastic in a sufficient concentration to effect satisfactory stabilization. This differs from the use of such insoluble inorganic borohydrides as, for example, sodium borohydride, which is not sufficiently soluble in the desired concentration. Furthermore, the alkali-metal borohydride is water soluble and will be removed from the plastic when exposed outdoors and subjected to rain or when the plastic is washed with an aqueous medium.

The novel inhibitor of the present invention is a soluble quaternary ammonium borohydride and may be illustrated by the following general formula:

$$R_4N:BH_4$$

where each of the groups is independently selected from hydrocarbyl groups. The hydrocarbyl groups generally will each contain from 1 to about 24 carbon atoms. In another embodiment up to 3 of the R groups may be interconnected as members of the same ring system.

The total number of carbon atoms in the R groups generally is within the range of from about 10 to about 50 carbon atoms and preferably is within the range of from about 15 to about 30 carbon atoms. Illustrative quaternary ammonium borohydrides include dodecyltrimethylammonium borohydride,
tridecyltrimethylammonium borohydride,
tetradecyltrimethylammonium borohydride,
pentadecyltrimethylammonium borohydride,
hexadecyltrimethylammonium borohydride,
heptadecyltrimethylammonium borohydride,
octadecyltrimethylammonium borohydride,
nonadecyltrimethylammonium borohydride,
eicosyltrimethylammonium borohydride,
heneicosyltrimethylammonium borohydride,
docosyltrimethylammonium borohydride,
tricosyltrimethylammonium borohydride,
tetracosyltrimethylammonium borohydride,
pentacosyltrimethylammonium borohydride,
hexacosyltrimethylammonium borohydride,
heptacosyltrimethylammonium borohydride,
octacosyltrimethylammonium borohydride,
nonacosyltrimethylammonium borohydride,
triacontyltrimethylammonium borohydride,
hentriacontyltrimethylammonium borohydride,
dotriacontyltrimethylammonium borohydride,
tritriacontyltrimethylammonium borohydride,
tetratriacontyltrimethylammonium borohydride,
pentatriacontyltrimethylammonium borhydride, etc.,
diheptyldimethylammonium borohydride,
dioctyldimethylammonium borohydride,
dinonyldimethylammonium borohydride,
didecyldimethylammonium borohydride,
diundecyldimethylammonium borohydride,
didodecyldimethylammonium borohydride,
ditridecyldimethylammonium borohydride,
ditetradecyldimethylammonium borohydride, etc.,
triamylmethylammonium borohydride,
trihexylmethylammonium borohydride,
triheptylmethylammonium borohydride,
trioctylmethylammonium borohydride,
trinonylmethylammonium borohydride, etc.,
ethylundecyldimethylammonium borohydride,
propylundecyldimethylammonium borohydride,
butylundecyldimethylammonium borohydride,
amylundecyldimethylammonium borohydride,
hexylundecyldimethylammonium borohydride,
heptylundecyldimethylammonium borohydride,
octylundecyldimethylammonium borohydride,
nonylundecyldimethylammonuim borohydride,
decylundecyldimethylammonium borohydride, etc.,
ethyldodecyldimethylammonium borohydride,
propyldodecyldimethylammonium borohydride,
butyldodecyldimethylammonium borohydride,
amyldodecyldimethylammonium borohydride,
hexyldodecyldimethylammonium borohydride,
heptyldecyldimethylammonium borohydride,
octyldodecyldimethylammonium borohydride,
nonyldodecyldimethylammonium borohydride,
decyldodecyldimethylammonium borohydride, etc.,
butyldecyldimethylammonium borohydride,
amyldecyldimethylammonium borohydride,
hexyldecyldimethylammonium borohydride,
heptyldecyldimethylammonium borohydride,
octyldecyldimethylammonium borohydride,
nonyldecyldimethylammonium borohydride, etc.,
amylnonyldimethylammonium borohydride,
hexylnonyldimethylammonium borohydride,
heptylnonyldimethylammonium borohydride,
octylnonyldimethylammonium borohydride, etc.,
hexyloctyldimethylammonium borohydride,
heptyloctyldimethylammonium borohydride, etc.

In some cases the alkyl groups will be derived from fatty acids and thus the alkyl group is selected from capryl, lauryl, myristyl, cetyl, stearyl, arachidic, behenic, lignoceric, cerotic, etc. It is understood that the alkyl group may be straight chain or may contain branching in the chain. In another embodiment, one or more of the R groups comprises cycloalkyl as illustrated in compounds as cyclohexyltriethylammonium borohydride,
dicyclohexyldimethylammonium borohydride,
cycloheptyltripropylammonium borohydride,
cyclooctyltrimethylammonium borohydride,
cyclobutyltripentylammonium borohydride,
cyclopropyltrinonylammonium borohydride,
cyclopropyltrinonylammonium borohydride, etc.,
as well as benzyltrimethylammonium borohydride,
benzyltriethylammonium borohydride,
phenethyltrimethylammonium borohydride, etc.

In another embodiment, two or three of the R groups may comprise a common ring system as illustrated by such compounds as N,N-diethylpiperidinium borohydride,
N,N-dimethylmorpholinium borohydride,
N,N-dipropylhexamethyleneiminium borohydride, etc.

When desired, the R groups also may contain substituents compatible with the borohydride anion-portion of the inhibitor including, for example, hydroxy, alkoxy, aryloxy, alkymercapto, arylmercapto, aminoalkylamino, arylamino, acyl, acyloxy, halo, nitro, etc. It is understood that the different quaternary ammonium borohydrides are not necessarily equivalent in the same or different plastic, but all of them will serve to retard deterioration of a plastic subject to deterioration by ultraviolet light.

The quaternary borohydride is prepared in any suitable manner. In one method it is prepared by the reaction of tetraalkylammonium hydroxide or tetraalkylammonium salts of inorganic and organic acids with an alkali metal borohydride in the presence of polar solvents. This reaction proceeds metathetically at low or moderate temperature in the presence of the solvent. Illustrative solvents include water, liquid organic amines such as triethylamine, trimethylamine, triisopropylamine, aliphatic alcohols such as methyl, ethyl, propyl, isopropyl and butyl alcohols, amides such as formamide, etc. When water is used, it may be rendered alkaline by the addition of alkaline material such as a quaternary ammonium hydroxide or an alkali metal hydroxide to reduce or prevent the liberation of hydrogen by reaction with the alkali metal borohydride.

The quaternary ammonium borohydride is incorporated in the plastic in a stabilizing concentration which preferably is from about 0.5% to about 2% by weight of the plastic, although higher concentrations to about 10% by weight may be used.

The inhibitor is incorporated in the plastic in any suitable manner and at any suitable stage of preparation. In one method the plastic is recovered as powder, pellets, cylinders, spheres, sheets, rolls, bars, etc., and these may be commingled with the inhibitor in any suitable manner such as by partly melting the plastic and adding the inhibitor to the hot melt. This is readily accomplished, for example, by heating the plastic on a steam heated two-roll mill of conventionl commercial design and adding the inhibitor during this operation. The plastic containing the inhibitor is recovered in sheet form and may be fabricated in any desired manner. In another method the inhibitor is added in a Banbury mixer, an extruder or in any other suitable manner. When fibers are desired, the inhibited plastic is recovered from the Banbury mixer and is extruded through a spinnerette.

The inhibitor is utilized as such or is prepared as a solution in a suitable solvent including alcohols, and particularly methanol, ethanol, propanol, butanol, etc., hydrocarbons and particularly benzene, toluene, xylenes, cumene, etc. However, the solvent must not be detrimental to the plastic and, therefore, a preferred solvent comprises the same solvent used during the manufacture or working of the plastic. It is understood that the inhibitor also may be used along with other additives incorporated in plastics for various purposes. For example, in colored plastics carbon black is used in a concentration of below about 5% by weight and generally of from about 1% to about 3% by weight. Similarly, pigments, zinc oxide, titanium oxide, etc., may be incorporated in plastics, the oxides usually being employed in a concentration of from about 2% to about 10% by weight. In many cases, silicates, dyes and/or fillers also are incorporated in the plastic.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, dialkylated phenols, trialkylated phenols, diphenyl-p-phenylenediamine, dinaphthyl-p-phenylenediamine, p-octyl-phenylsalicylate and other salicylic acid esters, various phosgene-alkylated phenol reaction products as various alkoxyalkyldihydroxybenzophenones, polyalkyldihydroxybenzophenones, tetrahydroxybenzophenones, etc. Other ultraviolet light stabilizers include nickel-bis-dithiocarbonates, nickel-bis-dihydroxypolyalkylphenol sulfides, dilauryl-beta-mercaptodipropionate, dihydroxytetraalkyl methanes, dihydroxytetraalkyl sulfides, etc., various trithiophosphites as trilauryl phosphite, hexalkylphosphoric amides, trialkyl phosphites, etc.

The following examples are introduced to illustrate further the novelty and utility of the present invention but not with the intention of unduly limiting the same.

EXAMPLE I

The inhibior of this example is tricaprylmethylammonium borohydride and was evaluated in a special batch of commercial solid polyethylene. This special batch of solid polyethylene was obtained free from any inhibitors in order that it may be used as a proper control sample to evaluate the effect of different inhibitors. The solid polyethylene without inhibitor was used as the blank or control sample and the results obtained with this sample were compared with the results obtained with samples of the solid polyethylene containing the inhibitors of the present invention.

In one method the solid polyethylene was evaluated in an Atlas type DL–TS Weather-Ometer. The Weather-Ometer may be operated with or without the use of water sprays to simulate accelerated moist weathering. In the present runs, the water sprays were not used, thereby simulating accelerating the effect of hot airy weathering, a much more severe condition. Polyethylene pellets were milled in a two-roll heated mill of conventional commercial design and the inhibitor was incorporated in the samples during the milling. The samples were pressed into sheets of 17 mil thickness and cut into plaques of 1⅜″ x 1½″. The plaques then were inserted into plastic holders, affixed onto a rotating drum and exposed to carbon arc rays at about 125° F. in the Weather-Ometer. Periodically samples of the polyethylene were subjected to infrared analysis and the intensity of the carbonyl band at 1715 cm.$^{-1}$ was determined and expressed as "carbonyl number." As hereinbefore set forth, the formation of carbonyl groups is an indication of deterioration of the polyolefin. The higher intensity of the carbonyl band indicates a higher carbonyl concentration (expressed as carbonyl number) and accordingly increased deterioration.

Samples of the polyethylene also were evaluated by outdoor exposure. The plaques of polyethylene prepared in the above manner were exposed to weathering on an outdoor rack facing south and inclined at a 45° angle at Des Plaines, Illinois. Here again, the samples were analyzed for extent of carbonyl formation in the manner described in the previous paragraph.

The results of evaluations in the Weather-Ometer and outdoor exposure are reported in the following tables for a sample of the polyethylene with no added inhibitor and for a sample containing 1% by weight of tricaprylmethylammonium borohydride.

TABLE I

| Additive/Hours | Weather-Ometer—Carbonyl Number | | | | |
|---|---|---|---|---|---|
| | 0 | 48 | 144 | 192 | 240 |
| None | 36 | 79 | 300 | 468 | |
| 1% by weight of tricaprylmethylammonium borohydride | 62 | 48 | 67 | | 126 |

TABLE II

| Additive/Days | Outdoor Exposure—Carbonyl Number | | | | | | | | |
|---|---|---|---|---|---|---|---|---|---|
| | 0 | 103 | 115 | 185 | 198 | 268 | 281 | 337 | 365 |
| None | 24 | 88 | | 126 | | 640 | | | |
| 1% by weight of tricaprylmethylammonium borohydride | 68 | | 59 | | 76 | | 102 | 132 | *132 |

*Test was still continuing.

From the data in the above table, it will be seen that the inhibitor of the present invention served to reduce the carbonyl number of the polyethylene. Referring to Table I, it will be noted that the solid polyethylene without inhibitor developed a carbonyl number of 468 after 192 hours. In contrast, the sample containing the inhibitor of the present invention developed a carbonyl number of only 126 after 240 hours.

Referring to Table II, it will be seen that the sample without inhibitor developed a carbonyl number of 640 after 268 days of outdoor exposure and that the sample containing the inhibitor had reached a carbonyl number of only 132 after 365 days and that the test was still continuing.

The inhibited samples of polyethylene remained white during the milling and even after exposure both in the Weather-Ometer and outdoors, thus further demonstrating the effectiveness against UV light.

EXAMPLE II

The inhibitor of this example is cetyltrimethylammonium borohydride. It was evaluated in another sample of the solid polyethylene described in Example I. These evaluations were made in the same manner described in Example I and the results are reported in the following tables. For comparative purposes, the evaluations made of the polyethylene without inhibitor are repeated.

TABLE III

| Additive/Hours | Weather-Ometer—Carbonyl Number | | | | | |
|---|---|---|---|---|---|---|
| | 0 | 48 | 144 | 192 | 240 | 336 |
| None | 36 | 79 | 300 | 468 | | |
| 1% by weight of cetyltrimethylammonium borohydride | 50 | 60 | 84 | | 132 | 197 |

TABLE IV

| Additive/Days | Outdoor Exposure—Carbonyl Number | | | | | | | | |
|---|---|---|---|---|---|---|---|---|---|
| | 0 | 103 | 115 | 185 | 198 | 268 | 281 | 337 | 365 |
| None | 24 | 88 | | 126 | | 640 | | | |
| 1% by weight of cetyltrimethylammonium borohydride | 40 | | 75 | | 102 | | 135 | 173 | (*) |

*Test was still continuing.

Here again, it will be seen that the inhibitor of the present invention served to reduce the carbonyl number of the polyethylene. Referring to Table III, it will be seen that the sample of polyethylene without inhibitor developed a carbonyl number of 468 after 192 hours, whereas the sample of polyethylene containing the inhibitor developed a carbonyl number of only 197 after 336 hours. Similarly, in referring to Table IV, it will be noted that the sample of polyethylene without inhibitor developed a carbonyl number of 640 after 268 days, but that the samples of polyethylene containing the inhibitor developed a carbonyl number of only 173 after 337 days.

As was the case in Example I, the inhibited samples of polyethylene, during milling and after exposure in both the Weather-Ometer and outdoors, remained white in color.

EXAMPLE III

The plastic of this example is a solid polypropylene which is stated to have the following properties:

TABLE V

| | |
|---|---|
| Specific gravity | 0.910–0.920 |
| Refractive index, $n_d^{25}$ | 1.510 |
| Heat distortion temperature: | |
| At 66 p.s.i. load °F | 240 |
| At 264 p.s.i. load °F | 150 |
| 638–58T) (0.2″ per min.) p.s.i. | 4700 |
| Tensile yield strength (ATSM D–638–58T) (0.2″ per. min.) p.s.i. | 4700 |
| Total elongation percent | 300–400 |
| Stiffness flexural (ATSM D747–50), $10^5$ p.s.i. | 1.8 |
| Shore Hardness (ASTM D676–55T) | 74D |

Here again, the solid polypropylene used in these evaluations did not contain added inhibitor. A sample of the polypropylene was used as a control or blank sample.

The inhibitor was milled into another sample of the polypropylene in substantially the same manner described in Example I. The inhibitor of this example is tricaprylmethylammonium borohydride and was used in a concentration of 1% by weight.

The results of evaluations in the Weather-Ometer and outdoor exposure are reported in the following tables:

TABLE VI

| | Weather-Ometer—Carbonyl Number | | |
|---|---|---|---|
| Additive/Hours | 0 | 48 | 144 |
| None | 161 | 951 | (*) |
| 1% by weight of tricaprylmethylammonium borohydride | 216 | 273 | 845 |

*Brittle-broken.

TABLE VII

| | Outdoot Exposure—Carbonyl Number | | | | |
|---|---|---|---|---|---|
| Additive/Days | 0 | 14 | 28 | 88 | 142 | 198 |
| None | 222 | 608 | 1,000+ | | | |
| 1% by weight of tricaprylmethylammonium borohydride | 250 | 251 | | 272 | 262 | 388 |

Here again, it will be noted that the inhibitor of the present invention effectively reduced carbonyl formation of the polypropylene in both the Weather-Ometer and outdoor exposure. Referring to Table VI, it will be noted that the control sample developed a carbonyl number of 951 after 48 hours and became brittle and broken after this time. In contrast, the sample of polypropylene containing the inhibitor developed a carbonyl number of 845 after 144 hours. Referring to Table VII, it will be seen that the control sample reached a carbonyl number of 1000+ after only 28 days, but that the sample of polypropylene containing the inhibitor developed a carbonyl number of only 388 after 198 days.

In all cases, the inhibited polypropylene was clear and colorless after milling and after exposure in the Weather-Ometer and outdoors. Here again, the effectiveness of the inhibitor to prevent deterioration due to ultraviolet absorption is demonstrated.

EXAMPLE IV

Cetyltrimethylammonium borohydride also was evaluated in the solid polypropylene described in Example III. These evaluations were made in the same manner described in the previous example. The results of these evaluations are reported in the following tables:

TABLE VIII

| | Weather-Ometer—Carbonyl Number | |
|---|---|---|
| Additive/Hours | 0 | 48 |
| None | 161 | *951 |
| 1% by weight of cetyltrimethylammonium borohydride | 324 | 393 |

*Brittle-broken.

TABLE IX

| | Outdoor Exposure—Carbonyl Number | | | | |
|---|---|---|---|---|---|
| Additive/Days | 0 | 14 | 28 | 88 | 142 |
| None | 222 | 608 | 1,000+ | | |
| 1% by weight of cetyltrimethylammonium borohydride | 262 | 256 | | 245 | 283 |

Referring to the above tables, it will be seen that the inhibitor of the present invention served to retard carbonyl development. In all cases, the inhibited samples were colorless and clear after milling and after exposure in the Weather-Ometer and outdoors. Here again, the effectiveness of the inhibitor of the present invention in inhibiting deterioration due to ultraviolet light is demonstrated.

EXAMPLE V

The inhibitor of this example is stearyltrimethyl ammonium borohydride and is used as an inhibitor in solid polybutylene. The inhibitor is incorporated by hot melt addition of the inhibitor to the polybutylene being heated and pressed on a conventional two-roll steam heated mill. The polybutylene sheets then are heat-compressed to a thickness of 20 mils, cut into plaques of 1½″ x 1½″ and mounted in plastic holders. The plaques are evaluated both in the Weather-Ometer and by outdoor exposure in the manner hereinbefore described in detail. The addition of the inhibitor serves to effectively inhibit carbonyl development.

EXAMPLE VI

The inhibitor of this example is trilaurylmethylammonium borohydride and is used as an inhibitor in polystyrene. The inhibitor is incorporated in a concentration of 0.5% by weight in polystyrene by partly melting the polystyrene and incorporating the inhibitor in the hot melt. The polystyrene containing the inhibitor is of improved resistance to deterioration by ultraviolet light.

EXAMPLE VII

The inhibitor of this example is heneicosyltrimethylammonium borohydride and is utilized as an inhibitor in polyvinyl chloride plastic. Here again, the inhibitor is incorporated by partly melting the polyvinyl chloride plastic and incorporating the inhibitor in the hot melt in a concentration of 1% by weight. This serves to inhibit deterioration of the polyvinyl chloride plastic due to ultraviolet light.

EXAMPLE VIII

Cetyltrimethylammonium borohydride is utilized in a concentration of 0.5% by weight in nylon. The inhibitor is incorporated in a Banbury mixer and the nylon is formed into fibers in a spinnerette. This serves to inhibit deterioration of the nylon due to ultraviolet light.

I claim as my invention:

1. Solid polymer normally subject to deterioration by ultraviolet light containing, as an inhibitor against said deterioration, a stabilizing concentration of from about 0.5% to about 10% by weight of a soluble quarternary ammonium borohydride inhibitor having the formula $$R_4N:BH_4$$

wherein each R is indipendently selected from hydrocarbyl groups.

2. The solid polymer of claim 1 wherein said inhibitor is cetyltrimethylammonium borohydride.

3. The solid polymer of claim 1 wherein said inhibitor is tricaprylmethylammonium borohydride.

4. The solid polymer of claim 1 being solid polyolefin.

5. The solid polymer of claim 1 being solid polyethylene.

6. The solid polymer of claim 1 being solid polypropylene.

7. The solid polymer of claim 1 being solid polybutylene.

8. The solid polymer of claim 1 being solid polystyrene.

References Cited

UNITED STATES PATENTS 3,108,139  11/1963  Larchar _____ 252—188 XR
3,179,620  4/1965  Cyba _____ 260—45.9

FOREIGN PATENTS 10,567  8/1962  Japan.

OTHER REFERENCES

Chem. Abstracts 58, p. 115456 (1963).
Richter, Textbook of Organic Chemistry, John Wiley & Sons, New York, 1962, p. 252.

DONALD E. CZAJA, *Primary Examiner.*

M. J. WELSH, *Assistant Examiner.*